Patented Dec. 5, 1922.

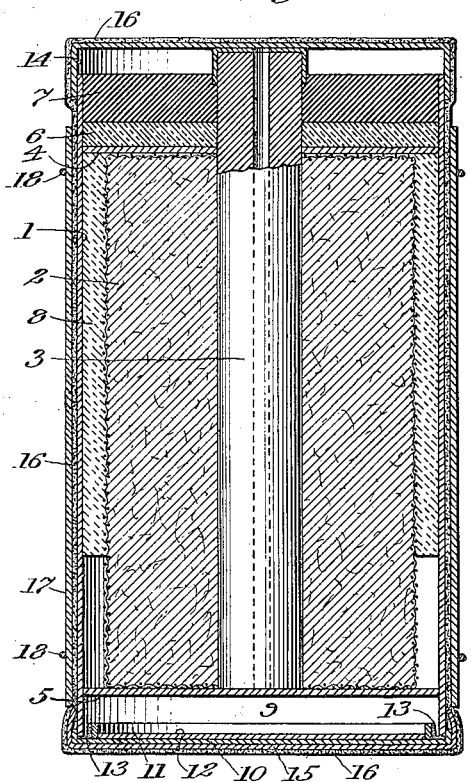
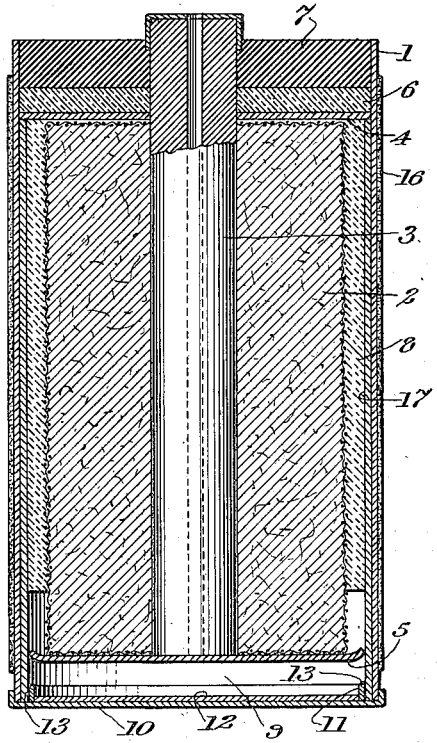
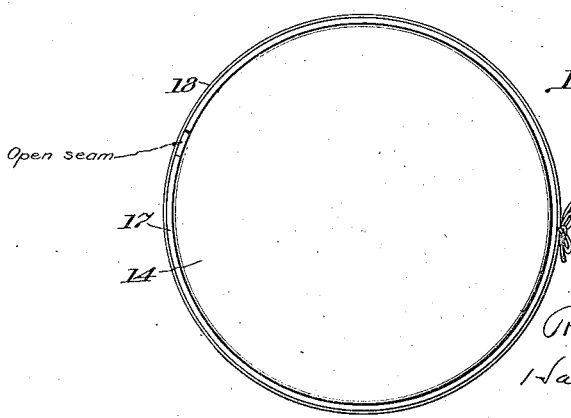

1,438,085

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

Application filed April 15, 1920. Serial No. 374,228.

*To all whom it may concern:*

Be it known that we, RAYMOND C. BENNER and HARRY F. FRENCH, citizens of the United States, residing at Fremont, in the county of Sandusky and State of Ohio, have invented certain new and useful Improvements in Electric Batteries, of which the following is a specification.

This invention relates to dry cells of the deferred action type which are inactive until the user performs some manipulation to render them active. In our copending applications Serial No. 314,197, filed July 30, 1919, and Serial No. 358,260, filed February 12, 1920, we have illustrated a construction having a zinc can located outside the cell in the inactive condition and adapted to be inserted in the cell to render it active. Our present invention relates to a similar type of cell.

The object of the present invention is to reduce the shipping space necessary for cells of the type referred to in our copending application and to secure a single package cell of approximately the same size as ordinary dry cells.

The invention resides in the use of a hollow insertable metallic electrode which has an aperture extending in a longitudinal direction. In the preferred constructions, the electrode may be fitted around the cell prior to service, and subsequently contracted to permit its insertion in the cell. It is not necessary that the aperture be parallel to the axis of the electrode.

In the drawings the details of a preferred construction embodying the invention are illustrated by way of example, in which:

Fig. 1 is a central longitudinal section of a cell in the inactive condition.

Fig. 2 is a similar section of the cell after it has been put into service.

Fig. 3 is a plan view of the cell in the inactive condition.

The cell illustrated comprises a retainer or casing 1 and a molded mix bobbin 2 spaced therefrom, having a hollow central carbon electrode 3 therein with one end projecting from the mix. As it is desirable to entirely obviate the necessity for the user adding water, electrolyte solution or other ingredients, the depolarizing mix will preferably be molded from a mixture of carbon and manganese dioxide moistened with the required amount of electrolyte solution. The bobbin is spaced from the can by means of insulating disks 4 and 5 at each end. A closure for the upper end of the cell preferably consists of two layers 6 and 7, the lower layer or subseal 6 adjacent the disk 4 being of relatively soft elastic material, and the upper layer 7 consisting of any of the ordinary sealing compositions. By utilizing a soft subseal we have found that more perfect sealing is secured than by the use of ordinary closures consisting of hard pitch and red sealing compound.

The space between the mix and casing contains a relatively heavy paste 8 of flour, starch, etc., preferably containing electrolyte solution and a preservative. The external casing which is adjacent the paste may be made from either metallic or nonmetallic materials which withstand the electrolyte and do not introduce undesirable impurities in the cell. If metallic casings are used, a coating of lacquer or suitable paint is preferably applied to the interior and exterior thereof.

At the lower end of the cell an air chamber 9 is provided below the disk 5 and between the casing and lower projecting end of the carbon electrode. Before the cell is put into service the article constructed as described is closed at the lower end by any closure which is suitable for the particular type of casing selected. In the illustration a metallic casing having a detachable press fit metal bottom 10 is shown, said bottom having a flange 11 soldered to the interior of the bottom and a paper disk 12 within the flange. The outer diameter of the flange is slightly less than the internal diameter of the casing for a reason that will be mentioned later. It is also desirable to apply a layer 13 of soft gummy material to the exterior of the flange and the projecting edge of the bottom, to provide an air-tight closure. When a hollow carbon electrode is used, the upper and lower ends of the casing may be covered by caps 14 and 15 and the entire article coated with paraffine 16 to prevent evaporation.

In the construction shown a sheet 17 of zinc rolled into cylindrical form, having an open longitudinal seam, is utilized, which is secured around the cell by means of cords 18 for example, or merely held by the tendency of the rolled zinc to contract. Electrodes of various shapes may be utilized but we prefer a cylindrical zinc electrode as this may be readily fitted around the exterior of the cell and subsequently contracted to fit the diameter of the interior of the casing.

As long as the cell is out of service the zinc will be preferably maintained around the cell where it occupies no appreciable space. The assembly can be shipped as a one package unit without substantially increasing the shipping space required for a given number of cells over that of ordinary dry cells. As the zinc is not exposed to the electrolyte, corrosion cannot occur; and as evaporation of moisture is prevented, the cells may be kept indefinitely without deterioration.

To place the cell in action the user will remove the zinc, the paper caps and the closure at the lower end. One end of the zinc will then be inserted in the lower end of the cell and the closure will be fitted on the other end of the zinc electrode with the flange 11 inside the zinc. The electrode will then be inserted by pressing the edges of the zinc together and forcing the closure towards the end. This will insert the zinc in the cell with its surface adjacent the casing and enclosing substantially all of the paste. When the zinc is fully inserted it abuts against the disk 4. The space between the casing 1 and flange 11 will be filled by the zinc and sealing compound. The closure for the lower end will then be pressed against the lower end of the casing to close the cell tightly.

As the metal closure is in electrical contact with the zinc electrode, the number of cells may be connected in series by placing the exposed end of the carbon electrode of one cell in electrical contact with the metal closure of an adjacent cell.

On account of the manner in which the paste, mix bobbin and zinc electrode are assembled in intimate contact and in the relations best suited for service, the cell is adapted to immediately give substantially full amperage as no absorption is necessary as in the ordinary deferred action cells in which the water is added.

Having described our invention, what we claim is:—

1. An electric cell of the deferred action type, comprising a hollow metallic electrode insertable in the cell to activate the same, said electrode having an aperture extending in a longitudinal direction.

2. An electric cell of the deferred action type, comprising a casing for the battery ingredients and a hollow metallic electrode insertable in the casting to activate the cell, said electrode having an aperture extending in a longitudinal direction.

3. An electric cell of the deferred action type, comprising a casing for the battery ingredients, a removable closure at one end of the casing and a hollow metallic electrode insertable in the casing through said end in such manner as to activate the cell, said electrode having an aperture extending in a longitudinal direction.

4. An electric cell of the deferred action type, comprising a casing, a depolarizing mix bobbin therein spaced therefrom, a filling of conducting material between the bobbin and casing and a hollow metallic electrode insertable in the casing to activate the cell, said electrode having an aperture extending in a longitudinal direction.

5. An electric cell of the deferred action type, comprising a casing, a depolarizing mix bobbin therein spaced therefrom, a filling of electrolyte paste between the bobbin and casing, a removable closure at one end of the casing and a hollow metallic electrode insertable in the casing in such manner as to activate the cell through said end, said electrode having an aperture extending in a longitudinal direction.

6. An electric cell of the deferred action type, comprising a casing, and a hollow metallic electrode conforming to the shape of the exterior of the casing and insertable in the interior thereof to activate the cell, said electrode having an aperture extending in a longitudinal direction.

7. An electric cell of the kind described, comprising a casing for the battery ingredients, a hollow metallic electrode conforming to the shape of the exterior of the casing and adapted to also conform with and be insertable in the interior of the casing, said electrode having an aperture extending in a longitudinal direction, and a removable closure for one end of the casing having a projection adapted to be placed in engagement with one end of the electrode to cause it to conform to the shape of the interior of the casing.

8. An electric cell of the kind described, comprising a casing for the battery ingredients, a hollow metallic electrode conforming to the shape of the exterior of the casing and adapted to also conform with and be insertable in the interior of the casing, said electrode having an aperture extending in a longitudinal direction, and a removable closure for one end of the casing having a flange adapted to be placed in engagement with one end of the electrode to cause it to conform to the shape of the interior of the casing.

9. An electric cell of the kind described, comprising a cylindrical casing for the battery ingredients, a sheet of zinc conforming to the shape of the exterior of the casing and placed therearound, said sheet having an open seam extending in a longitudinal direction.

10. An electric cell of the deferred action type, comprising a casing for the battery ingredients, a removable metallic cap for one end of the casing and a hollow metallic electrode insertable in the casing to activate the cell, said electrode having an aperture extending in a longitudinal direction.

11. An electric cell of the kind described, comprising a cylindrical casing, a depolarizing mix bobbin therein, a filling of conducting paste between the bobbin and casing, a seal for closing one end of the casing, a removable closure for the other end, and a sheet of zinc conforming to the shape of the exterior of the casing having an open seam extending in a longitudinal direction, said sheet being contractible to permit it to be inserted in the casing through the end having the removable closure to activate the cell.

In testimony whereof, we affix our signatures.

RAYMOND C. BENNER.
HARRY F. FRENCH.